United States Patent
Miura

(10) Patent No.: US 9,382,029 B2
(45) Date of Patent: Jul. 5, 2016

(54) ANGULAR RESIN CONTAINER AND BLOW MOLDING DIE

(71) Applicant: Toyo Seikan Group Holdings, Ltd., Tokyo (JP)

(72) Inventor: Masaki Miura, Kanagawa (JP)

(73) Assignee: TOYO SEIKAN GROUP HOLDINGS, LTD, Tokyo (JP)

( * ) Notice: Subject to any disclaimer, the term of this patent is extended or adjusted under 35 U.S.C. 154(b) by 0 days.

(21) Appl. No.: 14/258,370

(22) Filed: Apr. 22, 2014

(65) Prior Publication Data
US 2014/0224814 A1 Aug. 14, 2014

Related U.S. Application Data

(63) Continuation of application No. PCT/JP2012/006290, filed on Oct. 2, 2012.

(30) Foreign Application Priority Data

Nov. 9, 2011 (JP) ................. 2011-245071

(51) Int. Cl.
*B29C 49/48* (2006.01)
*B65D 1/40* (2006.01)
*B65D 1/02* (2006.01)
(Continued)

(52) U.S. Cl.
CPC . *B65D 1/40* (2013.01); *B29C 49/28* (2013.01); *B65D 1/0207* (2013.01); *B29C 49/06* (2013.01); *B29C 49/08* (2013.01); *B29C 49/48* (2013.01); *B29C 2049/028* (2013.01); *B29C 2049/4882* (2013.01); *B29K 2905/02* (2013.01);
(Continued)

(58) Field of Classification Search
CPC ............. B29C 2049/4897; B29C 2049/4892; B29C 49/48; B29C 2049/4882
See application file for complete search history.

(56) References Cited

U.S. PATENT DOCUMENTS 3,474,493 A 10/1969 Staples
6,660,216 B1 12/2003 Porter
(Continued)

FOREIGN PATENT DOCUMENTS

CN 1407935 A 4/2003
CN 101588970 A 11/2009
(Continued)

OTHER PUBLICATIONS

Office Action issued in corresponding Chinese Application No. 201280054759.7, mailed Feb. 25, 2015 (7 pages).
(Continued)

*Primary Examiner* — Robert B Davis
(74) *Attorney, Agent, or Firm* — Osha Liang LLP

(57) ABSTRACT

Provided are an angular resin container, which while being thin, retains excellent appearance in respect of luster, transparency or the like, as well as a blow molding die for subjecting the container to biaxial stretch blow molding. Biaxial stretch blow molding is conducted with a blow molding die having a scallop height for the surface of the blow molding die, that corresponds to the side wall part of the body part of the angular resin container, of 3 to 30 µm, thereby to obtain an angular resin container having a thickness of the body part of 0.5 mm or less and in which a horizontally-directed processed part having a depth of 3 to 30 µm is formed on the outer surface of the side wall part of the body part.

1 Claim, 3 Drawing Sheets

(51) Int. Cl.
*B29C 49/28* (2006.01)
*B29C 49/08* (2006.01)
*B29L 31/00* (2006.01)
*B29C 49/06* (2006.01)
*B29C 49/02* (2006.01)

(52) U.S. Cl.
CPC . *B29L2031/7158* (2013.01); *B65D 2501/0081* (2013.01)

(56) References Cited

U.S. PATENT DOCUMENTS

| | | | |
|---|---|---|---|
| 8,097,317 | B2 | 1/2012 | Katou et al. |
| 2004/0022976 | A1 | 2/2004 | Kato et al. |
| 2010/0086715 | A1 | 4/2010 | Katou et al. |

FOREIGN PATENT DOCUMENTS

| | | |
|---|---|---|
| JP | H05-185498 A | 7/1993 |
| JP | 07-026312 U | 5/1995 |
| JP | H09-254159 A | 9/1997 |
| JP | 2833317 B2 | 12/1998 |
| JP | 2005-035184 A | 2/2005 |
| JP | 2007-331111 A | 12/2007 |
| JP | 2009-241971 A | 10/2009 |
| JP | 2009-262947 A | 11/2009 |

OTHER PUBLICATIONS

International Search Report issued in PCT/JP2012/006290, mailing date Dec. 11, 2012 (2 pages).

International Preliminary Report on Patentability issued in PCT/JP20121006290, issuance date May 13, 2014 (6 pages).

ANGULAR RESIN CONTAINER AND BLOW MOLDING DIE

TECHNICAL FIELD

The present invention relates to a resin-made container having an angular cross section (hereinafter referred to as the "angular resin container") and a blow molding die for biaxial stretch blow molding of the angular resin container. In particular, the present invention relates to an angular resin container in the shape of a bottle and has heat resistance, and a blow molding die for biaxial stretch blow molding of the angular resin container.

BACKGROUND ART

Conventionally, a resin container in the shape of a bottle obtained by subjecting a polyester resin such as polyethylene terephthalate to injection molding or compression molding to form a preform, and then molding the preform in the shape of a bottle by the biaxial stretch blow molding has generally been used in wide ranges of fields as a container for beverages that accommodate various types of beverages.

In a blow molding die used in the biaxial stretch blow molding, a space (hereinafter referred to as the "cavity") that suits to a desired shape of a bottle is formed by subjecting a material such as an aluminum alloy to cutting, followed by further cutting by means of a ball end mill. In general, in the final stage of the cutting, the material is cut by means of a ball end mill having a diameter of 2 mm with a feed pitch of about 0.05 mm, whereby the height of cutting marks formed by a ball end mill on the surface of the cavity (hereinafter referred to as the "scallop height") is allowed to be about 0.3 μm. Then, after the cutting, the cavity surface of the blow molding die is mirror-finished by polishing (about Rz 0.01 stipulated by JIS B0601). By conducting biaxial stretch blow molding by using the blow molding die, a resin container having luster and transparency is obtained. However, if matting or less transparency is required for the outer surface of a resin container for the reason of design, a surface treatment or the like (e.g. sand blasting) may be further conducted in order to impart the outer surface with roughness.

In recent years, with the aim of lowering the production cost, decreasing the amount of wastes or the like, there has been a growing demand for thinning a resin container in order to decrease the amount of raw material resins used. However, if the resin container becomes thin, the strength of the container is inevitably decreased, and as a result, the container tends to be deformed easily. In particular, in the case of an angular resin container, when a blow molding die is opened to release the container, a side wall part 41 that has a larger area as compared with a corner surface part is stuck to the die surface, and the side wall part is pulled outwardly. As a result, as shown in FIG. 4, a problem arises that a corner surface part 42 that has been released from the mold earlier than the side wall part 41 acts such that it deforms in the form of a recess towards the inside of the container. This phenomenon becomes significant in biaxial stretch blow molding in which a die is heated to a high temperature (the crystallization temperature) at the time of biaxial stretch molding. For example, in Patent Document 1 or the like, in order to prevent deformation that occurs at the time of mold releasing associated with thinning of a container, an angular resin container is proposed in which the cavity surface after the cutting is allowed to be roughened.

In the blow molding, a resin container is molded by setting a heated preform in a blow molding die and blowing a high-pressure air. If the cavity surface of the blow molding die is a mirror-finished surface, a problem arises that air remains between the container and the cavity surface, and as a result, pockmark-like air pool marks are formed on the surface of the container, resulting in deterioration of the appearance. Under such circumstances, Patent Document 2 or the like propose a blow molding die in which, by blasting sand to the surface of a cavity after the cutting to allow the surface to be stain-like rough surface, a gap is formed between a resin to be stretched and the cavity surface, whereby air is released.

RELATED ART DOCUMENT

Patent Documents

Patent Document 1: JP-A-2009-241971
Patent Document 2: Japan Patent No. 2833317

SUMMARY OF THE INVENTION

Problems to be Solved by the Invention

However, in each of the technologies disclosed in Patent Document 1 and Patent Document 2, since a treatment for roughening the cavity surface is conducted after the cutting, the roughened surface is transferred to a container. As a result, although there is no reasons regarding the design, luster and transparency are significantly deteriorated. The present invention has been made in view of the above-mentioned circumstances, and is aimed at providing an angular resin container, that, while being thin, retains good appearance in respect of luster, transparency or the like, and a blow molding die for producing the angular resin container.

Means for Solving the Problem

According to the present invention, an angular resin container having a thickness of a body part of 0.5 mm or less, wherein a horizontally-processed part having a depth of 3 to 30 μm is formed on the surface of a side wall part of the body part.

In the angular resin container of the present invention, it is preferred that the distance between adjacent tops of the horizontally-processed part be 0.1 to 1.0 mm.

Further, according to the present invention, a blow molding die for subjecting an angular resin container having a thickness of a body part of 0.5 mm or less to biaxial stretch blow molding, wherein the scallop height for the surface of a cavity of a blow molding die, that corresponds to the side wall part of the body part, is 3 to 30 μm.

In the blow molding die of the present invention, it is preferred that the distance between adjacent tops in the scallop height be 0.1 to 1.0 mm.

According to the angular resin container of the present invention, an angular resin container which, while being thin, has excellent appearance in respect of luster, transparency or the like can be provided.

Further, according to the blow molding die for the angular molding resin container of the present invention, without conducting a surface treatment to allow the cavity surface to be rough after cutting, it is possible to obtain easily by molding an angular resin container that is thin and has excellent appearance in respect of luster, transparency or the like by significantly decreasing mold release resistance at the time of releasing from the cavity surface of the blow molding die the angular resin container after the biaxial stretch blow molding, whereby the container is prevented from being deformed.

MODE FOR CARRYING OUT THE INVENTION

Figure 1:
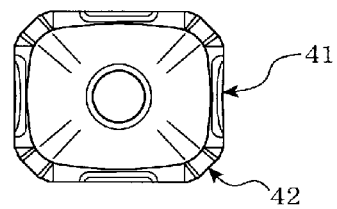
FIG. 1 is a view showing the angular resin container according to the present invention, in which (a) is a plan view, (b) is a front view, (c) is a side view and (d) is a view showing the region of the surface for decreasing mold release resistance.
Figure 1:
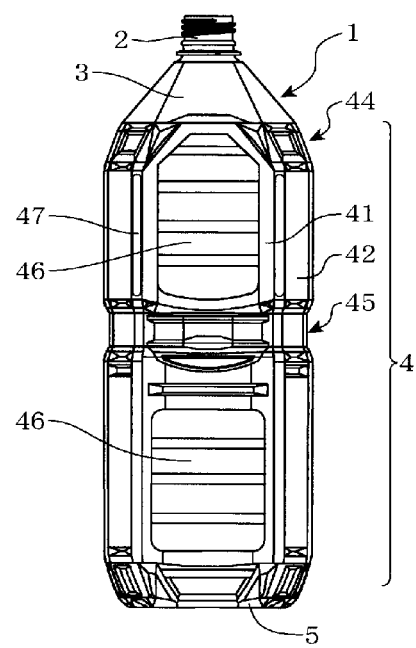
Figure 1:
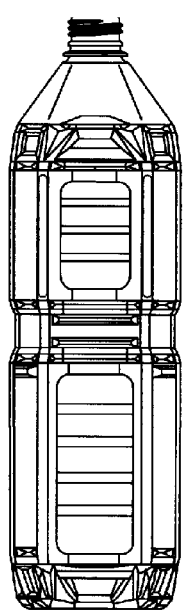
Figure 1:
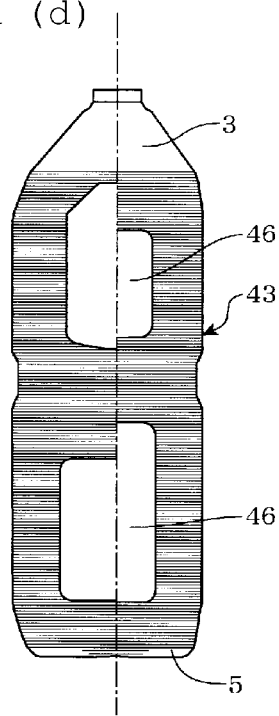

Hereinafter, a preferable embodiment of the present invention will be explained with reference to the drawings.

In this embodiment, for example, an angular resin container 1 is a container obtained by subjecting a bottomed cylindrical preform that is made of a thermoplastic resin and is produced by known injection molding or compression molding to biaxial stretch blow molding. The container 1 has a mouth part 2, a shoulder part 3, a body part 4 and a bottom part 5. The shape of a lateral cross section that orthogonally crosses the height direction of the body part is angular, and a rectangular-shaped inner pressure-adjusting panel 46 is formed on a side wall part 41 of the body part 4.

As the thermoplastic resin that constitutes the angular resin container 1, an arbitral resin can be used as long as it can be subjected to biaxial stretch blow molding. As specific examples, thermoplastic polyesters such as polyethylene terephthalate, polybutylene terephthalate, polyethylene naphthalate, polycarbonate, polyarylate, polylactic acid or copolymers thereof, a blend of these resins, a blend of these resins with other resins, a laminate of these resins are preferable.

In particular, an ethylene terephthalate-based thermoplastic polyester such as polyethylene terephthalate is preferably used. In addition, an acrylonitrile resin, polypropylene, propylene, a propylene-ethylene copolymer, polyethylene or the like can also be used.

In the angular resin container 1 shown in FIG. 1, the mouth part 2 is formed in a cylindrical shape. On the outer periphery of the mouth part 2, a threaded part for attaching a cap (not shown) is provided. After filling contents, the cap is attached to the mouth part 2, thereby sealing the angular resin container 1.

The shoulder part 3 is positioned between the mouth part 2 and the body part 4, and is formed such that it connects the body part 4 with the diameter thereof being increased from the mouth part 2.

The body part 4 is a part that occupies a major part of the height direction of the angular resin container 1. In this embodiment, the shape of a lateral cross section that crosses orthogonally the height direction is a rectangle having rounded corners. As a result, the body part 4 of the angular resin container 1 is formed of a pair of opposing side wall parts 41 and corner surface parts 42 located between the side wall parts 41, whereby the angular resin container 1 is allowed to be a container having an angular cross section. In this embodiment, a tapered part 44 is provided on the upper end side of the body part 4.

The "height direction" means a direction that crosses orthogonally the horizontal plane when the container 1 is allowed to stand upright on the horizontal plane with the mouth part 2 being directed upward. Similarly, the "horizontal direction" means the direction that is in parallel with the horizontal plane. In this upright state, the upward and downward as well as the lateral and vertical directions of the angular resin container 1 are stipulated.

Here, in the vicinity of the center of the height direction of the body part 4, a ring-like recess part 45 that extends along the entire periphery is formed. In the side wall part 41, on each of the upper side and the lower side of the ring-like recess part 45, an inner pressure-adjusting panel 46 is formed. The inner pressure-adjusting panel 46 is formed such that, after contents are filled and sealed at a high temperature, when the pressure inside the container is decreased by cooling, for example, the decrease in inner pressure is absorbed by the deformation of the container.

In the side wall part 41, along the boundary with the corner surface part 42, a vertical groove 47 is formed. Due to the formation of such vertical groove 47, in order to compensate lowering in strength caused by thinning of the angular resin container 1, strength against a load applied from the lateral direction is increased, and even if the angular resin container 1 is deformed, the shape can be easily restored to the original shape.

As shown in FIG. 1(d) by hatching, a surface 43 for decreasing mold release resistance is formed as a horizontally-directed processed part on the outer surface of the side wall part 41 of the body part 4 excluding the mouth part 2, the shoulder part 3, the inner pressure-adjusting panel 46 of the body part 4 and the bottom part 5.

In FIG. 1(d), a part shown on the left side of the dashed line corresponds to the front surface of the angular resin container 1 shown in FIG. 1(b), and a part shown on the right side of the dashed line corresponds to the side surface of the angular resin container 1 shown in FIG. 1(c). In the body part 4 of the angular resin container 1 of this embodiment, the outer surface of the side wall part 41 of the body part 4 excluding the inner pressure-adjusting panel 46 is allowed to be the surface 43 for decreasing mold release resistance. If need arises, the inner pressure-adjusting panel 46 can also be included in the surface 43 for decreasing mold release resistance.

The body part 4 is thin, i.e. having a thickness of 0.5 mm or less, preferably 0.2 to 0.4 mm. The depth of the horizontally-directed processed part of the surface 43 for decreasing mold release resistance is 3 to 30 µm. Due to such a configuration, the container 1 can be a container which is, while being thin, keeping excellent appearance in respect of luster, transparency or the like.

Further, by allowing the distance between adjacent tops of the horizontally-processed part to be 0.1 to 1.0 mm, the container can be an angular resin container having more excellent appearance in respect of luster, transparency or the like.

Figure 2:
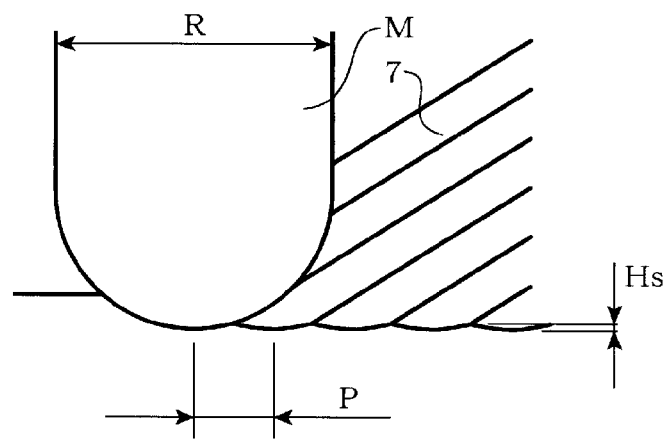
FIG. 2 is a schematic view that shows obliquely the processing state of the cavity surface of the blow molding die according to the present invention.

As for the surface of a cavity of the blow molding die 8 that molds the surface 43 for decreasing mold release resistance that is formed on the side wall part 41 of the body part 4 of the angular resin container 1, the scallop height Hs shown in FIG. 2 is 3 to 30 µm and the distance between the adjacent tops of the processing mark 7 is 0.1 to 1.0 mm as measured in the normal direction relative to the processing direction. By subjecting the above-mentioned bottomed cylindrical preform to biaxial stretch blow molding by means of the blow molding die 8 having the cavity surface mentioned above, the processing mark 7 is transferred, and hence, it is possible to obtain the angular resin container 1 having the body part 4 in which the surface 43 for decreasing mold release resistance made of the horizontally-processed part is formed.

In the thus produced angular resin container 1, since the outer surface of the side wall part 41 of the body part 4 serves as the surface 43 for decreasing mold release resistance, mold release resistance when releasing from the blow molding die 8 can be significantly decreased. In addition, since a force that acts to allow the corner surface part 42 to bend towards the inside of the container does not generate, formation of a recess in the corner surface part 42 can be prevented.

Accordingly, mold release resistance can be significantly decreased without conducting a surface roughening treatment after cutting and finishing of the cavity surface of the blow molding die 8, thereby enabling the angular resin container, that is thin, to have significantly excellent appearance in respect of luster, transparency or the like.

As for the method of processing the cavity surface, by allowing the diameter R of the ball end mill to be 8 mm and the feed pitch P to be 0.4 mm, for example, the scallop height Hs becomes 5.3 µm.

If the scallop height is less than 3 µm, mold release resistance generated when the angular resin container 1 is released from the blow molding die 8 is increased. At the same time, due to poor air bleeding, air partially remains between the angular resin container 1 and the cavity surface, and as a result, a pockmark-like part having a poor degree of luster appears on the outer surface of the surface 43 for decreasing the mold release resistance of the side wall part 41 of the body part 4 of the angular resin container 1. On the other hand, if the scallop height exceeds 30 µm, although mold releasability of the angular resin container 1 is improved, luster or transparency is significantly lowered, and when an impact is applied, such as dropping, the outer surface may suffer layer peeling off.

Figure 3:
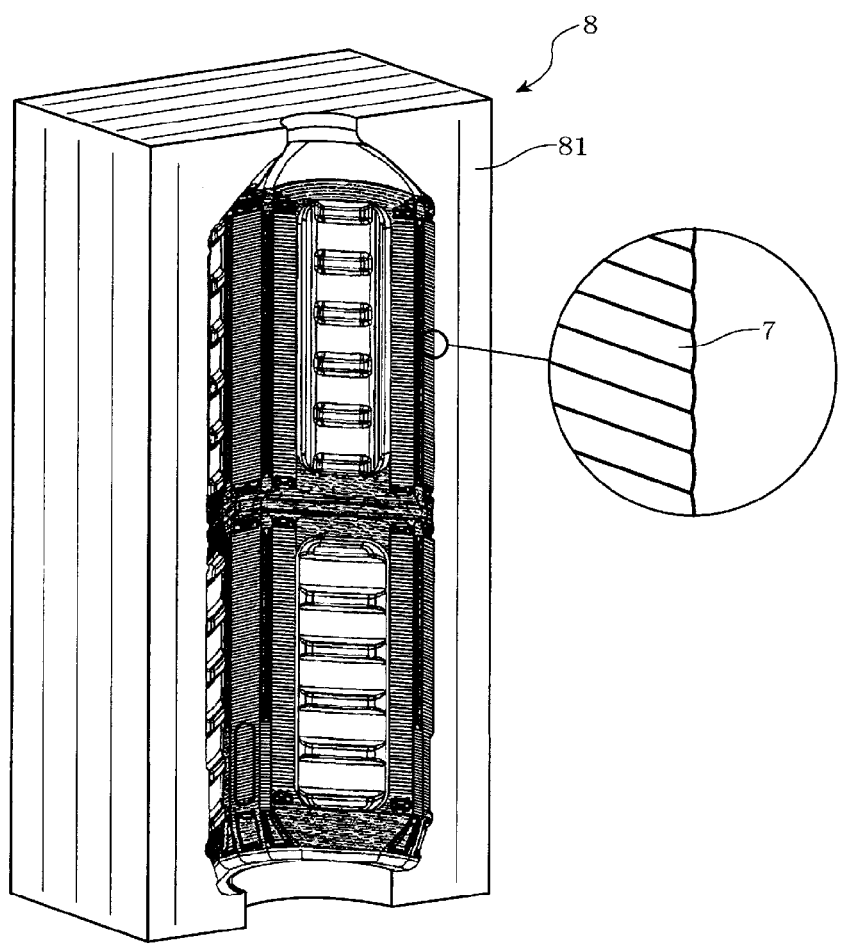
FIG. 3 is a perspective view of one of split molds of the blow molding die according to the present invention.
Figure 4:
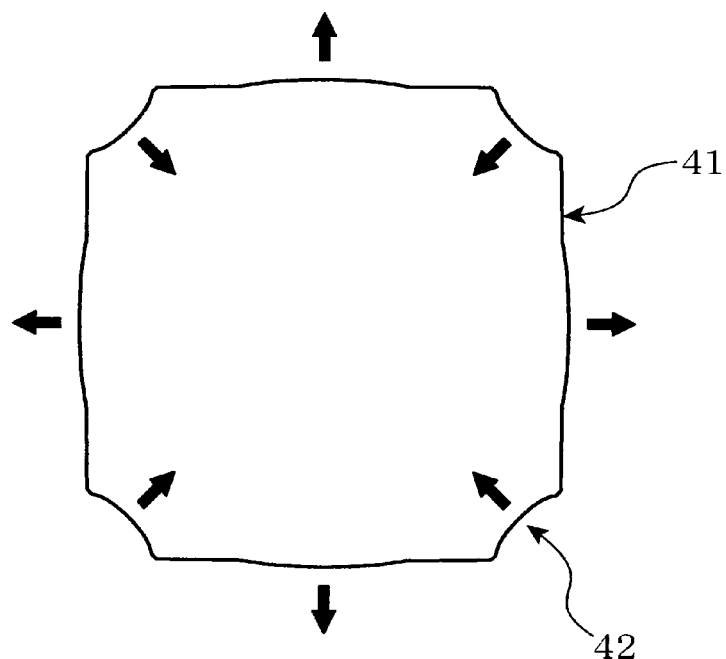
FIG. 4 is a diagrammatical view showing the state of deformation of the cross section of the body part when an angular resin container is released from a conventional blow molding die.

Further, as shown in FIG. 3, it is preferred that the processing marks 7 on the cavity surface of the blow molding die 8 be formed uniformly in a single direction in order to visually improve the appearance of the angular resin container 1 after the biaxial stretch blow molding. In addition, it is preferred that the direction of cutting by means of an end mill cross orthogonally the height direction. The reason is as follows. By the orthogonal crossing of the direction of cutting by means of an end mill relative to the height direction, the processing marks 7 are allowed to cross a parting surface 81 of the blow molding die 8 with the shortest distance, and as a result, at the time of the biaxial blow stretch molding, air in the cavity is efficiently discharged from the parting surface 81 of the blow molding die 8. As a result, deterioration of the appearance of the angular resin container 1 due to the presence of remaining air can be prevented, whereby the visual appearance of the container can be further improved.

If necessary, in order to remove small burrs in the processing marks 7 on the cavity surface of the blow molding die 8, it is preferable to conduct finishing such as shot blasting. In this embodiment, after cutting the cavity surface of the blow molding die 8 by means of a ball end mill, shot blasting was conducted by means of a grinding stone having a diameter of 1 to 10 µm. The unevenness of the surface 43 for decreasing the mold release resistance of the angular resin container 1 that had been finally subjected to blow molding was measured. The depth of the unevenness was 5.0 µm on average, and the distance between the adjacent tops was 0.4 mm on average. That is, it was revealed that the shape of the processing mark 7 was transferred while keeping almost the same shape.

Hereinabove, the present invention was explained with reference to the preferred embodiment. The present invention is not limited to the above-mentioned embodiment, and various modifications are possible within a range that does not fall outside the scope of the present invention. For example, the angular resin container 1 shown in the drawings has a configuration in which the body part 4 and shoulder part 3 are connected through the tapered part 44. According to need, formation of the tapered part 44 may be omitted. In addition, although it suffices that at least the side wall part 41 of the body part 4 serve as the surface 43 for decreasing mold release resistance, the inner pressure-adjusting panel 46, the corner surface part 42, the ring-shaped recess 45, the vertical groove 47 or the like may appropriately be included in the surface 43 for decreasing mold release resistance.

INDUSTRIAL APPLICABILITY

The angular resin container and the blow molding die according to the present invention can be applied as a bottle-shaped angular resin container that has heat resistance, and can also be applied as a blow molding die for biaxial stretch blow molding of the angular resin container.

DESCRIPTION OF REFERENTIAL NUMERALS

1. Angular resin container
2. Mouth part
3. Shoulder part
4. Body part
41. Side wall part
42. Corner surface part
43. Surface for decreasing mold release resistance (horizontally-processed part)
44. Tapered surface
45. Ring-like recess
46. Inner pressure-adjusting panel
47. Vertical groove
5. Bottom part
7. Processing mark
8. Blow molding die
81. Parting surface

The invention claimed is:
1. A blow molding die for subjecting an angular resin container having a thickness of a body part of 0.5 mm or less to biaxial stretch blow molding, comprising:
a cavity that forms a shape of the angular resin container; and
a parting surface in a height direction of the body part,
wherein a surface of the cavity that corresponds to a side wall part of the body part comprises processing marks formed by a ball end mill,
wherein a scallop height of the processing marks is 3 to 30 µm,
wherein a distance between adjacent tops in the scallop height is 0.1 to 1.0 mm, and
wherein the processing marks extend in a direction of cutting by the ball end mill and cross orthogonally to the height direction.

* * * * *